Figure 1:
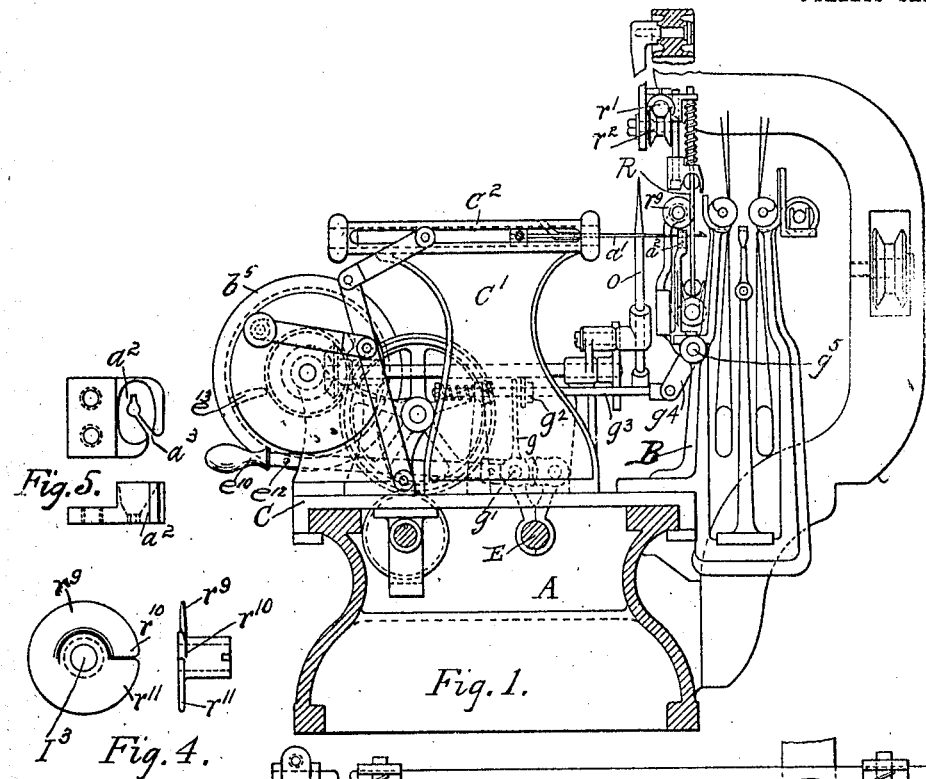

No. 871,680. PATENTED NOV. 19, 1907.
M. F. FIELD, E. F. HATHAWAY & C. D. LANNING.
WARP DRAWING MACHINE.
APPLICATION FILED MAY 16, 1904.

3 SHEETS—SHEET 1.

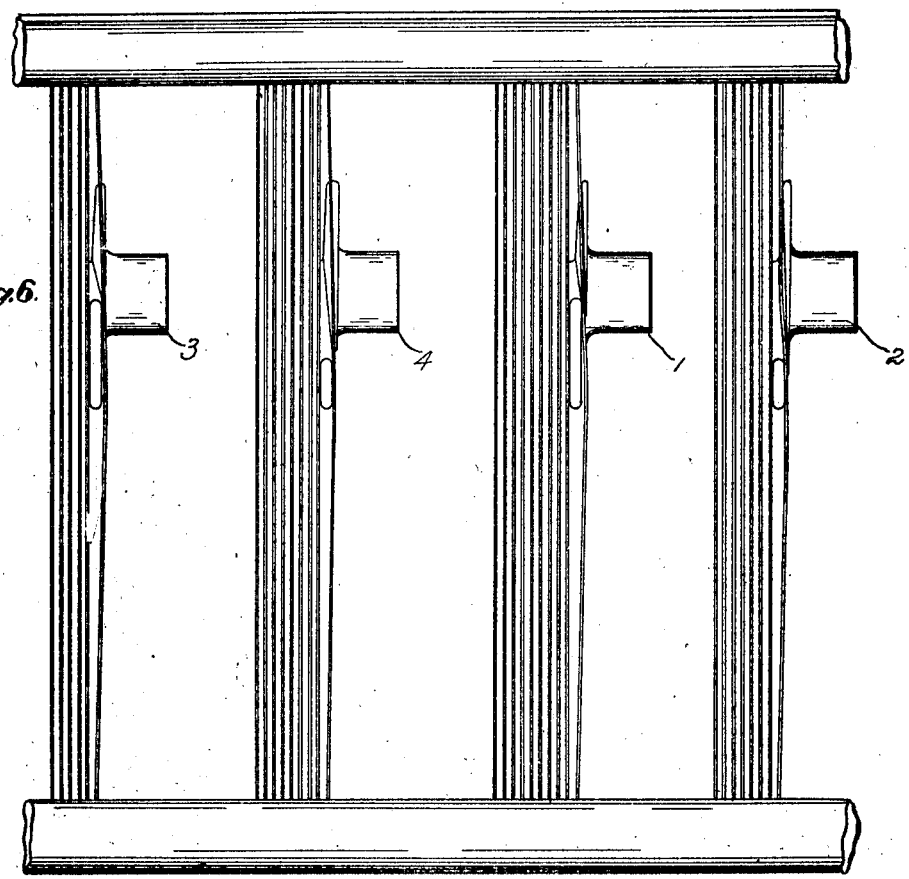

No. 871,680. PATENTED NOV. 19, 1907.
M. F. FIELD, E. F. HATHAWAY & C. D. LANNING.
WARP DRAWING MACHINE.
APPLICATION FILED MAY 16, 1904.

3 SHEETS—SHEET 2.

UNITED STATES PATENT OFFICE.

MILLARD F. FIELD, OF WINTHROP, AND EDGAR F. HATHAWAY AND CHARLES D. LANNING, OF BOSTON, MASSACHUSETTS, ASSIGNORS TO AMERICAN WARP-DRAWING MACHINE COMPANY, OF BOSTON, MASSACHUSETTS, A CORPORATION OF MAINE.

WARP-DRAWING MACHINE.

No. 871,680.   Specification of Letters Patent.   Patented Nov. 19, 1907.

Application filed May 16, 1904. Serial No. 208,105.

*To all whom it may concern:*

Be it known that we, MILLARD F. FIELD, of Winthrop, and EDGAR F. HATHAWAY and CHARLES D. LANNING, both of Boston, all in the county of Suffolk and Commonwealth of Massachusetts, have invented certain Improvements in Warp-Drawing Machines, of which the following is a specification.

This invention relates to warp drawing machines, and more particularly to improved means for guiding and supporting the drawing-in needle, an improved construction of reed-dent opener, as well as other mechanisms and instrumentalities coöperating with the needle, the needle driving mechanism and the reed opener.

Our invention will be best understood by reference to the following description, when taken in connection with the accompanying illustration of one specific embodiment thereof, while its scope will be more particularly pointed out in the appended claims.

Figure 2:
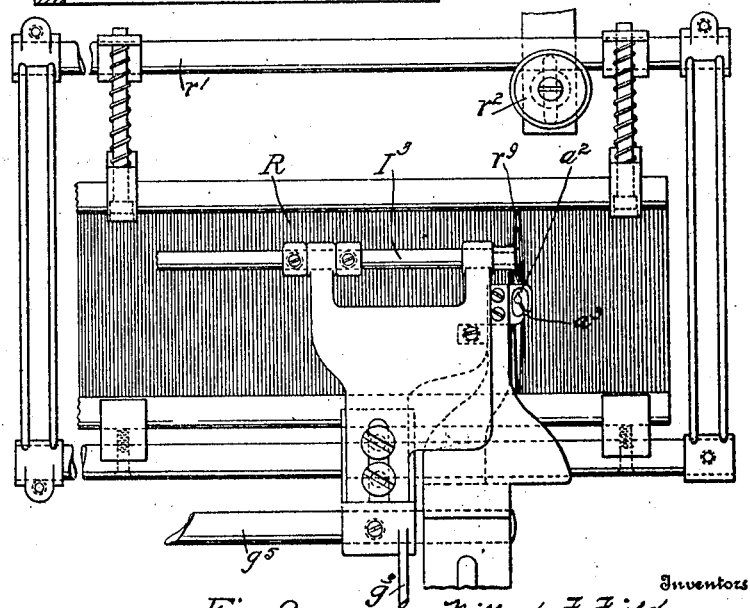
Figure 3:
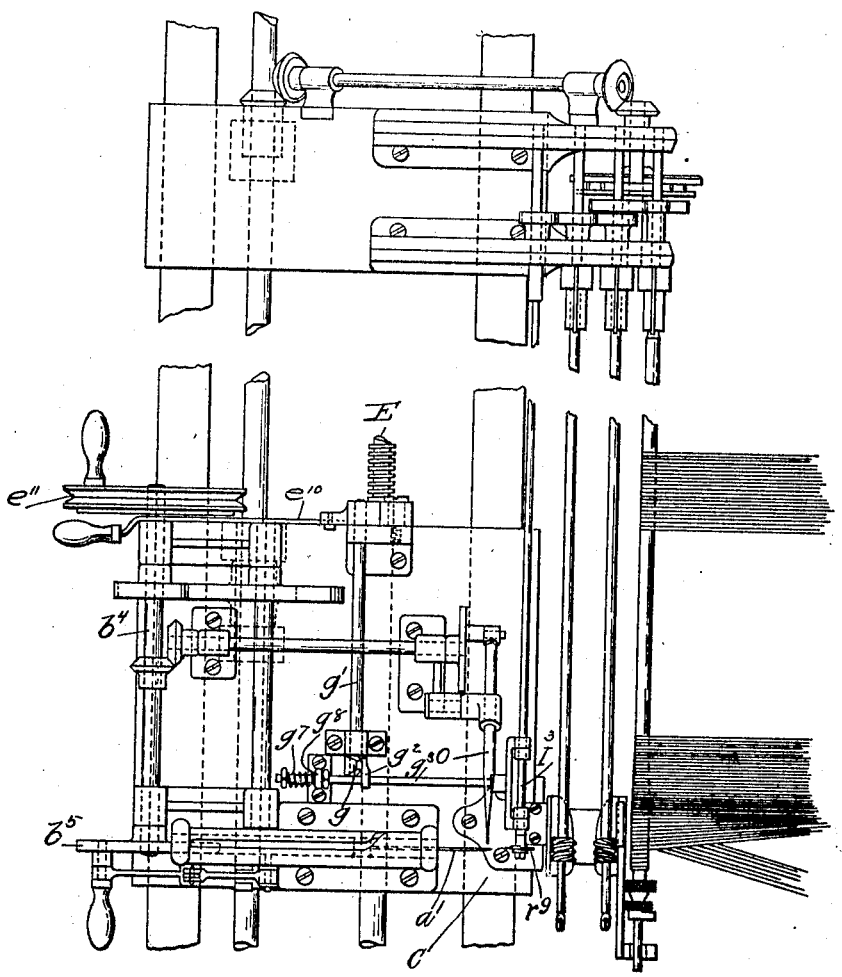

In the drawings:—Figure 1 is an end elevation of a warp drawing machine, showing the principal parts associated with the present improvements, portions of the lower part of the machine being shown in section; Fig. 2 is an elevation of the reed, the reed opener and its supports, and the needle guide viewed from the left in Fig. 1; Fig. 3 is a plan view of the machine with the main standard and reed removed; Fig. 4 shows an end and edge elevation of the reed opener; Fig. 5 shows a front and top view of the needle guide; Fig. 6 shows in front elevation several series of reed-dents undergoing separation by reed openers, constructed for contrast both according to one form of our present invention and according to the prior art; Figs. 7, 8, 9 and 10 are similar contrasting views shown in side elevation; Figs. 11 and 12 are similar contrasting views shown in section; and Figs. 13 and 14 are similar contrasting views shown in end elevation.

Referring to the drawings and to the embodiment of our invention there illustrated, upon the base A of the machine is mounted a sliding carriage C, the latter provided with a standard $c'$ acting to support the guide-way $c^2$ of the needle-stock $c^3$, as well as the mechanism which acts to reciprocate the needle $a'$. To give the needle a partial rotation near the outer end of its stroke the guide-way $c^2$ is provided with a curved slot $c^4$, which slot is engaged by a projecting pin carried by the stock $c^3$. At the inner end of the carriage there is also provided another standard B which supports the needle guide $a^2$ rigidly upon the carriage and in a definite position relatively to the path of the reciprocatory needle, but preferably near the front of the reed R, and below the reed opener, so that the needle guide is caused to travel with the carriage across the face of the reed and below the line of action of the reed opener. With one end supported also in the same standard B is the shaft $g^5$ which latter supports the bell-crank lever $g^4$, on the upright arm of which the end of the shaft for the reed opener $r^9$ has a bearing.

To rock the bell-crank lever $g^4$ about its fulcrum for withdrawing the reed opener from or replacing it in operative position relatively to the reed, the lower arm of the lever $g^4$ has jointed attachment to a backwardly extending rod $g^3$. The opposite end of the rod passes through an opening in a standard $g^8$ upon the carriage C and is provided with a spring $g^7$ between the standard and a checknut on the end of the rod. The rod therefore is normally retracted and the reed opener held forward in operative relation to the reed.

For the purpose of withdrawing the reed opener from the reed, and simultaneously locking the driving mechanism upon the carriage C, a lug $g^2$ is secured to the rod $g^3$, and against this lug bears an upright lever $g$. The lever $g$ is secured to a short longitudinal shaft $g'$ which is also the fulcrum of a hand operated locking-lever $e^{10}$ and of devices for engaging and disengaging the feed screw of the carriage C. The lever $e^{10}$ lies closely beside a wheel $e^{11}$ upon a counter-shaft $b^4$, which wheel has a curved locking slot $e^{13}$ extending from the edge inwardly, into which slot the locking pin $e^{12}$ on the lever $e^{10}$ may be moved by raising the outer end of the latter when the slot $e^{13}$ is in proper position. Raising the hand-lever $e^{10}$ therefore turns the shaft $g'$ and causes the lever $g$ to act upon the lug $g^2$ and push the rod $g^3$ toward the reed, together with the lower end of the crank-lever $g^4$. This will cause the upper end of the lever $g^4$ with the reed opener $r^9$ to move in the opposite direction and withdraw the opener from the reed. The crank-wheel $b^5$ which reciprocates the needle $a'$ and the wheel $e^{11}$, are upon the same shaft $b^4$, and the slot $e^{13}$ in the wheel $e^{11}$ is so located with relation to the crank pin on the wheel $b^5$ that the slot will be in position to receive the pin on the lever $e^{10}$ only when the needle $a'$ is at the extreme limit of its backward stroke. With the needle retracted, therefore, if the hand lever $e^{10}$ is raised the carriage is disconnected from the feed screw, the driving mechanism locked and the reed opener simultaneously withdrawn from the reed. If the handle is depressed the reed opener is drawn back into engagement with the reed, the driving mechanism released and the carriage operatively connected with the feed screw.

The supporting frame $r'$ for the reed is hung upon overhead anti-friction rolls so that it may be adjusted freely in a longitudinal direction by the mere action of the reed opener itself.

In order to strip the drawn-in thread from the needle $a'$ there is provided the downwardly acting reciprocating stripper arm $o$ operatively connected to the driving mechanism upon the carriage so that when the needle is at its extreme rearward position the arm acts to strip the thread downwardly.

The improved reed opener $r^9$ consists (Fig. 4) of a spiral blade which preferably extends along its operating shaft $i^3$, the latter journaled in the upright lever arm through an arc of not more than 360°. This blade also is preferably provided with a thin entering wedge $r^{10}$, increasing in thickness gradually until the circumferential portion $r^{11}$ is reached near the opposite edge of the blade, which enlarged portion $r^{11}$ holds the reed splits separated during the drawing-in operation. This construction and operation of the reed opener is a feature of considerable importance in a practical warp drawing machine, where the needle may be driven at a speed of from 200 to 300 picks per minute, and used in connection with reeds having from 35 to 60 splits to the inch. Under these circumstances accurate engagement and separation of the reed splits by the reed opener is difficult without frequently breaking the splits or unseating them from the reed shafts or impairing their resiliency by permanently bending or setting them.

If a reed opener having a spiral blade with a circumferential measurement of more than 360° is employed, engagement with the reed splits results in some such effect as is represented by the reed openers marked 1 and 2 in Fig. 6 and the reed openers shown in Figs. 8, 10 and 12, where it will be seen that the reed split is wiped between the two overlapping ends of the blade and given a compound bend. The rapid and severe downward wiping effect of an opener of this construction not only tends to abrade or mark the split as well as permanently to bend or set the same, but through the severe tension exerted also tends to pull the split from its seat.

With a reed opener having a circumferential blade portion of 360° or preferably less than 360°, as represented in the drawings, and with the same axial offset between the entering and leaving points, the blade can wipe down over the splits as rapidly as its rotative motion will permit, while allowing the split to assume a simple curved form, such, for example, as is shown by the split engaged by the reed openers 3 and 4 in Fig. 6 and by the reed opener in Figs. 7, 9 and 11. An exaggerated contrast between the action of the two reed openers is represented in Figs. 13 and 14. The gradual increase of the thickness from the entering to the leaving points of the blade provides a long, narrow wedge which effects the separation of the splits gradually and easily.

Another advantage of the reed opener having a circumferential blade portion of not more than 360° lies in the fact that the customary dwell or pause in the rotation of the reed opener, which dwell preferably takes place at or about the time of maximum separation to permit the passage of the needle, may occur as shown by reed opener 4 in Fig. 6 and by the reed opener in Fig. 9 at the instant when the leaving point is about to be withdrawn from one side of a split and the entering point has engaged the opposite side thereof, under which conditions the split is undergoing but little distortion. With the reed opener designated 2 in Fig. 6 or that shown in Fig. 10 and where the flange or blade is of greater extent than 360°, the period of dwell must occur when the split is considerably bent or distorted and this tends obviously to permanently set or distort the split.

Heretofore as shown in Sherman patent No. 363,689, May 24, 1887, the guide for the drawing-in needle has been located in substantially the same horizontal plane with the portion of the reed opener which engages the reed and outside of the axis of the reed opener, the opening from the needle guide through which the drawn-in thread was removed extending from the upper side of the guide opening so that when the thread was drawn out it was apt to remain in or fall down into the path of reciprocation of the needle, and thus be caught by it and pushed back into the reed by the next forward movement of the needle and entangled with the next drawn-in thread.

In the illustrated construction the needle guide $a^2$ has a bell-shaped mouth (Fig. 5) provided with a downwardly inclined exit slot $a^3$ through which the drawn-in thread may be forced down and away from the path of the needle by the reciprocatory stripper arm o. The bell-shaped mouth insures the entrance of the needle point even when somewhat deflected from its normal path, while the location of the guide close to the front or face of the reed and between it and a vertical plane passing through the axis of the reed opener, makes it specially effective in accurately presenting and introducing the needle point between the separated reed splits. The location of the thread guide not only provides for the positioning of the drawn-in thread away from the needle path but also away from the line of action of the reed opener. To assist this purpose the latter is best positioned, as shown, so as to have its line of progressive action parallel with and relatively near the top shaft of the reed. This positioning of the reed opener not only reduces the likelihood of conflict with the drawn-in thread but materially increases the effectiveness of the opener itself, for it is thereby caused to act upon the reed splits relatively near their seats where a slight spreading action causes a relatively wide separation at the mid-portion of the reed where the needle acts. For operating in this position where the reed splits are relatively stiff, a reed opener of the construction described is a marked advantage.

It will be observed that the needle guide $a^2$ has a rigid support upon the needle carriage and that in this respect it is independent of the reed opener, so that any tendency towards vibration or displacement of the thread guide under the needle action cannot affect the reed opener or vice versa.

While we have shown and described one form of our invention it will be understood that the same is not limited to the disclosed form or to the details of construction or form or relative arrangement of the parts shown, but that extensive modifications and departures may be made without departing from the spirit of our invention.

We claim:

1. In a warp-drawing machine, a loom-reed, supports upon which the reed may readily move longitudinally by the action of the reed-opener, and a rotary spiral reed-opener, the blade of which gradually increases in thickness from the edge which first enters the reed-dent to the part which holds the splits separated during the drawing-in operation.

2. In a warp-drawing machine, a loom-reed, supports upon which the reed may readily move longitudinally by the action of the reed-opener, and a rotary spiral reed-opener the blade of which extends through an arc not greater than 360 degrees of a circle.

3. In a warp-drawing machine, a loom-reed, a rotary spiral reed-opener, the blade of which extends through an arc not greater than 360 degrees of a circle, and gradually increases in thickness from its entering edge to the portion which holds the splits separated during the drawing-in operation.

4. In a warp-drawing machine, a loom-reed, a reciprocating drawing-in needle, a rotary reed-opener and a fixed needle-guide, located between the front of the reed and a vertical plane passing through the axis of the reed-opener.

5. In a warp-drawing machine, a loom-reed, a reciprocating drawing-in needle, a guide for the needle fixed upon the needle carriage in proximity to the reed, a rotary spiral reed-opener, and means to withdraw the opener from the reed and simultaneously lock the driving mechanism.

6. In a warp-drawing machine, a loom-reed, a reciprocating drawing-in needle, a guide for the needle, fixed upon the needle carriage in proximity to the reed, a rotary spiral reed-opener and an independent support therefor with means to operate the support to control the position of the opener in relation to the reed.

7. In a warp-drawing machine, a reciprocating drawing-in needle, a loom-reed, supports for the reed upon which it may readily move longitudinally by the action of the reed-opener, a reed-opener adapted to engage the splits continuously and successively open the dents for the passage of the drawing-in needle, a guide for the needle, fixed to needle carriage in a position close to the front of the reed, and an independent support for the reed-opener, which support is adapted to control the operative engagement of the opener with the reed.

8. In a warp-drawing machine, a reciprocating drawing-in needle, a fixed bell-mouthed needle-guide near the front of the reed and provided with a downwardly extending slot from the guide opening, for the release of the threads drawn-in.

9. In a warp-drawing machine, a drawing-in needle, means to reciprocate the needle longitudinally and rotatively, and a bell-mouthed needle-guide fixed in proximity to the front of the reed and independently supported on the needle carriage, which guide has a slot extending out from the guide opening to permit the passage of the drawn-in thread when stripped from the needle.

10. In a warp-drawing machine, a drawing-in needle, means to reciprocate the needle longitudinally and rotatively, a device to strip the drawn-in thread from the needle, and a needle-guide fixed in proximity to the reed and provided with a slot extending out from the guide opening in a direction below the horizontal, to permit the drawn-in thread to be removed therefrom and carried away from the path of reciprocation of the needle by the stripping device.

11. In a warp-drawing machine, a reciprocating drawing-in needle, a reed-opener, a needle-guide fixed in proximity to the reed below the reed-opener, which guide is provided with a thread releasing slot extending downwardly from the guide opening, and a needle stripping device adapted to press the drawn-in threads downward through said releasing slot.

12. In a warp drawing machine the combination with a loom-reed of a reciprocatory drawing-in needle, a needle carriage and a needle guide rigidly mounted on the carriage.

13. In a warp drawing machine the combination with a reciprocatory drawing-in needle, a needle carriage and a needle guide supported on the carriage.

14. The combination in a warp drawing machine of a loom-reed, a reed-opener, a reciprocatory drawing-in needle and a needle guide supported independently of the reed opener.

15. In a warp drawing machine the combination with a loom-reed, a reciprocatory drawing-in needle, a needle carriage and a needle guide supported on the carriage and positioned in front of the reed.

16. In a warp drawing machine the combination with a loom-reed, a reed opener having a movement into or out of operative relation to the reed and a needle guide having a fixed operative relation to the reed.

17. In a warp drawing machine having a reed, a swingingly mounted reed opener and a rigidly supported needle guide.

18. In a warp drawing machine the combination with a loom-reed of a rotatable reed opener and a needle guide, the latter positioned between the reed and a vertical plane passing through the axis of the reed opener.

19. In a warp drawing machine the combination with a reciprocatory drawing-in needle of a loom-reed, a needle guide and a reed opener having a line of action upon the reed above the path of the needle movement.

20. In a warp drawing machine the combination with a loom-reed, a needle guide and a reed opener, the latter mounted for withdrawal from the reed independently of the needle guide.

21. A warp drawing machine having a loom-reed and a reed opener, the latter having a line of action on the reed above the mid-portion of the reed splits.

22. A machine for drawing warp threads having a needle guide, a reciprocatory needle and a downwardly operating thread stripper arm.

23. A machine for drawing warp threads having a loom-reed, a needle guide, a reed opener positioned above the guide and means for stripping the drawn threads from the needle downwardly below the guide.

24. A machine for drawing warp threads having a needle guide with a downwardly directed thread exit slot to permit the downward stripping of the drawn threads.

25. A warp drawing machine having a rotary reed opener provided with a spiral blade extending through an arc not greater than 360°, said reed opener being positioned to act upon the reed at one side of the mid-portion of the reed split.

26. A warp drawing machine having a loom-reed, a reed opener acting upon the reed above the mid-portion of the reed splits and a reciprocatory drawing-in needle acting along the mid-portion of the reed splits.

27. A warp drawing machine having a reed opener, a needle, a needle guide and means to strip the threads below the reed opener and the guide.

28. A warp drawing machine having a loom-reed, a reciprocatory needle, a reed opener and downwardly acting thread stripping means.

29. In a warp drawing machine the combination with a loom-reed, a reciprocatory drawing-in needle, a rigidly positioned needle guide, a reed opener, driving mechanism and means simultaneously to lock the driving mechanism and render the reed opener inoperative.

MILLARD F. FIELD.
EDGAR F. HATHAWAY.
CHARLES D. LANNING.

Witnesses:
AGNES B. HUDSON,
HERBERT N. NUTE.